(12) United States Patent
Matsubara

(10) Patent No.: US 6,339,295 B1
(45) Date of Patent: Jan. 15, 2002

(54) LIGHT SOURCE LIGHTING DEVICE AND METHOD

(75) Inventor: Masaru Matsubara, Tokyo (JP)

(73) Assignee: MIC Works, Ltd., Zami (JP)

( * ) Notice: Subject to any disclaimer, the term of this patent is extended or adjusted under 35 U.S.C. 154(b) by 0 days.

(21) Appl. No.: 09/571,301

(22) Filed: May 12, 2000

(30) Foreign Application Priority Data

Sep. 16, 1999 (JP) .......................................... 11-261384

(51) Int. Cl.⁷ ................................................ B60Q 1/02
(52) U.S. Cl. ......................... 315/82; 315/307; 315/291
(58) Field of Search .......................... 315/82, 77, 83, 315/219, 209 M, 291, DIG. 5, 307, DIG. 7

(56) References Cited

U.S. PATENT DOCUMENTS 5,449,973 A * 9/1995 Yamashita et al. ............. 315/82
5,465,029 A * 11/1995 Hanazaki et al. ............ 315/308
5,486,740 A * 1/1996 Yamashita et al. .......... 315/308

* cited by examiner

*Primary Examiner*—Don Wong
*Assistant Examiner*—Ephrem Alemu
(74) *Attorney, Agent, or Firm*—John Schipper

(57) ABSTRACT

To provide a lighting device which is enabled to light a lamp of an incandescent bulb or the like in high luminance by a battery to be amounted on a vehicle. A lighting source lighting device 10 includes: an inverter 11 for converting a direct current from a vehicle-mounted battery 15 into an alternating current; and current adding means 13 for adding the direct current from the vehicle-mounted battery 15 and alternating current generated by the inverter 11, to supply a light source 14, such as a head lamp, with the added electric current. In this construction, the light source 14 is driven with the electric current containing the direct current and alternating current superimposed thereon so that the light source luminance microscopically changes with the period of the alternating current. With the naked eye, however, what light is trapped from the light source by the afterimage phenomena is a light at a luminous time so that the light source appears more luminous than at a time when only the direct current is applied.

17 Claims, 2 Drawing Sheets

LIGHT SOURCE LIGHTING DEVICE AND METHOD

BACKGROUND OF THE INVENTION

1. Field of the Invention

The present invention relates to a light source lighting device and method for lighting a light source to be mounted on a vehicle and, more particularly, to a light source lighting device and method suited for use in a device for lighting an electric bulb such as a head lamp and an auxiliary lamp.

2. Related Art

In the prior art, a head lamp or an auxiliary lamp (e.g., a fog lamp or a spot lamp) to be mounted on an automobile or another vehicle has been widely exemplified by an incandescent bulb or a halogen bulb (as will be referred to as the "incandescent bulb"). The vehicle-mounted incandescent bulb is enabled to emit a visible light by applying a direct current from a vehicle-mounted battery to a tungsten filament in a bulb filled with an argon gas, to heat the filament thereby to cause a thermal radiation. The luminance of the head lamp or the auxiliary lamp has direct relation with the visibility for a night drive. It is, therefore, important that a more luminous light emission is obtained by using the battery mounted on the vehicle as a current source.

On the other hand, the lifetime of the incandescent bulb depends on the evaporation rate of the filament. If the incandescent bulb is supplied with an electric current higher than the rated value so as to emit a more luminous light, therefore, the evaporation rate of the filament is accelerated to raise a problem that the lifetime of the incandescent bulb is shortened.

In recent years, on the other hand, a head lamp or an auxiliary lamp using a discharge tube for emitting a light by the discharge phenomenon has been proposed in place of the incandescent bulb. However, the lamp using the discharge tube is far more expensive than that using the incandescent bulb. When this lamp is to be mounted on the vehicle equipped with the lamp of the incandescent bulb, on the other hand, the existing lamp equipment has to be drastically changed.

SUMMARY OF THE INVENTION

It is, therefore, an object of the invention to solve the aforementioned problems of the prior art and to provide a lighting device capable of lighting a lamp of an incandescent bulb or the like more luminously with a battery mounted on a vehicle.

Another object of the invention is to provide a lighting device which is freed from shortening the lifetime of the incandescent bulb or the like so much even with the more luminous light emission.

Still another object of the invention is to provide a lighting device which can be additionally mounted on a vehicle having the lamp of the incandescent bulb or the like.

According to an aspect of the invention, there is provided a light source lighting device for lighting a light source to be mounted on a vehicle. The light source lighting device comprises: an inverter for converting a direct current from a vehicle-mounted battery into an alternating current; and current adding means for adding the direct current from the automobile-mounted battery and the alternating current generated by the inverter, to supply the light source with the added electric current.

In the aforementioned construction, the light source is driven by the electric current containing the direct current having alternating current superimposed, thereon so that the luminance of the light source microscopically changes with the period of the alternating current. With the naked eye, however, what is trapped as the light from the light source by the afterimage phenomenon is a light at a luminous time so that it looks more luminous than that at the time when only the direct current is applied.

On the other hand, the invention is preferably constructed to further comprise delay means for delaying an input timing at which the alternating current is supplied to the current adding means.

As a result, the light source is supplied at first with only the direct current and, after a delay of a predetermined time, with the electric current containing the superimposed alternating current. As a result, the electric current to rush into the light source is suppressed not to shorten its lifetime. On the other hand, the luminance stepwise changes so that it is more emphasized by the superimposed electric current.

According to another aspect of the invention, there is provided a light source lighting device comprising: a light source to be mounted on a vehicle; a direct current source; an alternating current source; and current adding means for adding a direct current from the direct current source and an alternating current from the alternating current source, to supply the light source with the added electric current.

In this case, the alternating current source preferably includes an inverter for converting the direct current from the direct current source into an alternating current.

In the aforementioned individual aspects, the direct current to be added in the current adding means is preferably within a voltage range of 10 to 25 V or 20 to 45 V.

On the other hand, the alternating current to be added in the current adding means is preferably within a voltage range of an effective value of 1 to 15 V.

Moreover, the alternating current to be added in the current adding means is preferably within a frequency range of 60 to 100 KHz.

In the aforementioned individual aspects, the vehicle-mounted light source is preferably an incandescent bulb or a halogen bulb.

On the other hand, the vehicle-mounted light source may be an LED.

According to still another aspect of the invention, there is provided a light source lighting method for lighting a light source to be mounted on a vehicle. The lighting method comprises: the step of converting a direct current from a vehicle-mounted battery into an alternating current; the step of adding the direct current from the vehicle-mounted battery and the converted alternating current; and the step of supplying the light source with the added electric cut

DESCRIPTION OF THE PREFERRED EMBODIMENT

Figure 1:
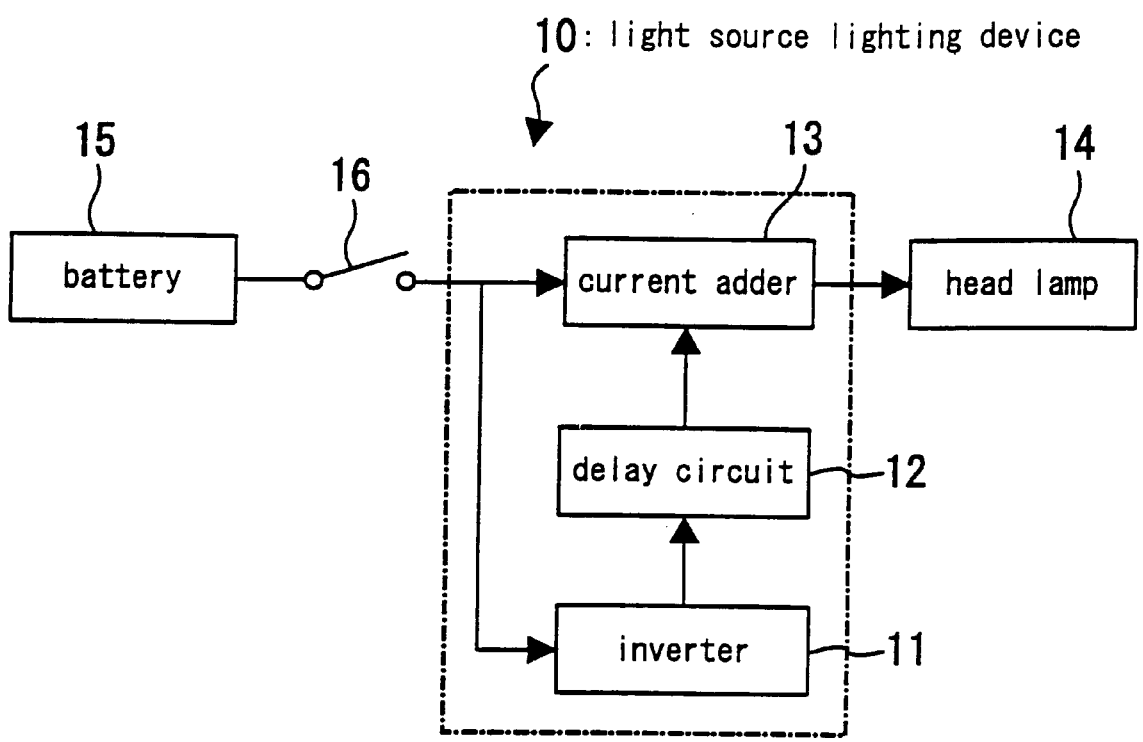
FIG. 1 is a block diagram including a light source lighting device, as constructed as a head lamp of an automobile, according to one embodiment of the invention.

One embodiment of the invention will be described with reference to the accompanying drawings. FIG. 1 is a block diagram including a light source lighting device, as constructed as a head lamp of an automobile, according to one embodiment of the invention. A light source lighting device 10 in this embodiment is provided for lighting a head lamp 14 of a halogen bulb or the like and is connected for use between the head lamp 14 and a battery 15 mounted on the automobile. As shown, the light source lighting device 10 is constructed to include an inverter 11, a delay circuit 12 and a current adder 13.

The inverter 11 converts a selected portion of the direct current from the battery 15 into an alternating current that is delivered to the current adder 13 while the remainder of the direct current from the battery is delivered to the current added. In one embodiment, the inverter 11 can input a direct current at 12 V (or 24 V) and output an alternating current having an effective value of 1 to 2 V. When the head lamp to be lit has a high durability against an excessive voltage, the inverter 11 may output an alternating current at 3 to 5 V. On the other hand, the frequency of the alternating current to be outputted preferably has a range of 60 to 100 KHz, especially in the vicinity of 80 KHz. Here, an alternating current of a frequency range (no more than 60 KHz or no less than 100 KHz) failing to fall under that range might be outputted.

The delay circuit 12 is provided for controlling a timing at which the alternating current generated by the inverter 11 is supplied to the current adder 13. By the action of the delay circuit 12, the current adder 13 is supplied at first when the switch 16 is turned ON with only the direct current from the battery 15 and, after a delay of a predetermined time set by the delay circuit 12, with the alternating current from the inverter 11. This delay time t0 to be set in the delay circuit 12 can be arbitrary but is set to about 1 to 2 seconds in one embodiment.

Figure 2:
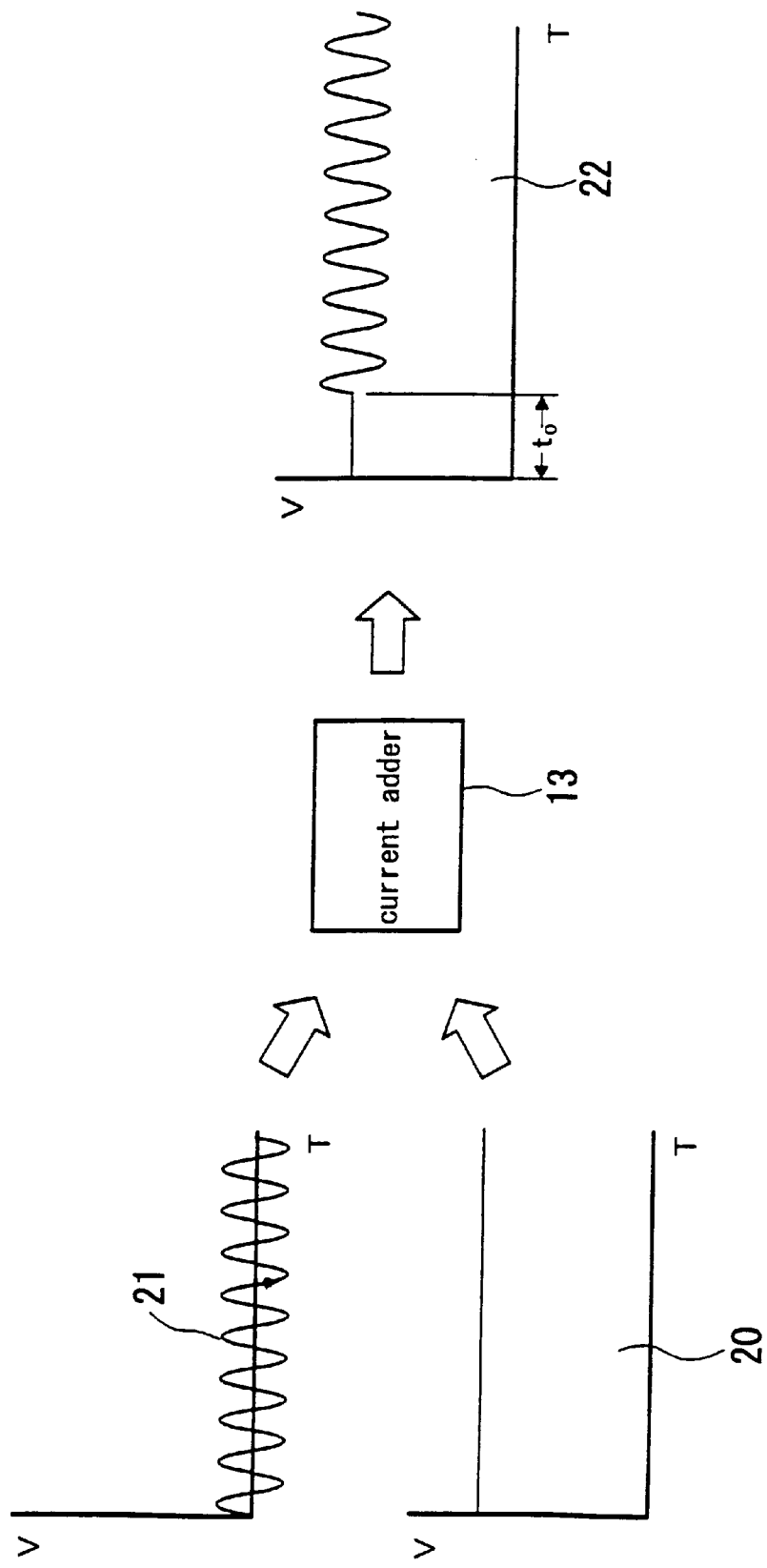
FIG. 2 is a diagram schematically showing functions in a current adder according to the invention.

The current adder 13 adds the DC component from the battery 15 and the AC component generated by the inverter 11. FIG. 2 schematically shows functions in the current adder 13. As shown, the current adder 13 receives and superimposes a direct current 20 and an alternating current 21, and outputs an AC signal 22 biased by the direct current. The head lamp 14 is driven and lit by the AC signal 22.

When the head lamp 14 is driven by the AC signal 22, the voltage to be applied changes with the period of the alternating current so that the luminance of the head lamp 14 accordingly changes microscopically. With the naked eye, however, what is trapped as the light from the head lamp 14 by the afterimage phenomenon is a light at a luminous time (i.e., a light by the effective voltage of the DC voltage +the alternating current) so that it looks more luminous than that at the time when only the direct current is applied. Here, the time t0 indicates one for which the alternating current is delayed by the delay circuit 12.

Instantly as the switch 16 is turned ON in the automobile mounting the light source lighting device 10, the direct current from the battery 15 is supplied to the head lamp 14 through the current adder 13 to light the head lamp 14. Simultaneously with this, the direct current from the battery 15 is supplied to the inverter 11 so that it is converted into an alternating current. The alternating current thus converted is inputted to the delay circuit 12 and is supplied after the predetermined delay time t0 to the current adder 13. From that time until the switch is opened, the current adder 13 outputs an electric current having the alternating current superimposed on the direct current from the battery 15 so that the head lamp 14 is lit drastically luminously by the electric current.

The invention has been described in connection with its embodiment with reference to the accompanying drawings. It is, however, apparent that the invention should not be limited to the embodiment but could be modified and improved on the basis of the definition of Claims. In the embodiment, the lighting device of the invention is constructed such that the head lamp to be lit uses the incandescent bulb. However, the head lamp might be made for an auxiliary lamp or a back light using an LED.

EXAMPLE

In the automobile provided with a halogen lamp to be lit by the batteries at 12 V and 24 V, the luminances of the halogen lamp were compared between the case (or the example) in which the light source lighting device of the construction thus far described was mounted and the case (or the prior art) in which the same was not. In the example, the effective current value (i.e., the direct current containing alternating current superimposed thereon) to be supplied to the halogen lamp at the time using the battery at 12 V was about 13 to 14 V. As a result, with the luminance of the prior art being 100%, the invention could achieved a luminance of 150 to 170%.

According to the invention, as has been described hereinbefore, the lamp of an incandescent bulb or LED can be lit more luminously by the vehicle-mounted battery.

According to the invention, on the other hand, with the illumination of the high luminance, the incandescent bulb or the like does not shorten its lifetime so much because the load to be applied thereto can be lowered.

On the other hand, the light source lighting device of the invention can be additionally mounted on the vehicle having the lamp of the incandescent bulb mounted thereon, so that its mounting cost can be low.

In the invention provided with the delay means, moreover, the light source is supplied at first with only the direct current and, after a delay of a predetermined time, with the electric current containing alternating current superimposed thereon. As a result, the electric current to rush into the light source is suppressed not to shorten its lifetime. On the other hand, the luminance stepwise changes so that it is more emphasized by the superimposed electric current.

What is claimed is:

1. A light source lighting device for lighting a light source to be mounted on a vehicle, comprising:

an inverter for converting a first selected portion of a direct current from a vehicle-mounted battery into an alternating current;

current adding means for adding the direct current from the vehicle-mounted battery and the alternating current generated by the inverter, to supply the light source with a sum of direct and alternating electric current; and a time delay circuit, located adjacent to the inverter, that delays delivery of the alternating current to the current adding means by a time interval, having a selected length t0, relative to a time that the direct current is first delivered to the current adding means, whereby the light source (1) receives a reduced direct-current-only contribution during a first selected time interval and (2) receives an increased contribution of the sum of the alternating current and the direct current during a subsequent second time interval.

2. The light source lighting device according to claim 1, wherein said time delay time interval length t0 lies in a range of 1 sec to 2 sec.

3. The light source lighting device according to claim 1, wherein the direct current to be added in said current adding means has a corresponding voltage range of 10 to 25 V.

4. The light source lighting device according to claim 1, wherein the direct current to be added in said current adding means has a corresponding voltage range of 20 to 45 V.

5. The light source lighting device according to claim 1, wherein the alternating current to be added in said current adding means has a corresponding voltage range with an effective 1 to 15 V.

6. The light source lighting device according to claim 1, wherein the alternating current to be added in said current adding means has a corresponding frequency range of 60 to 100 KHz.

7. The light source lighting device according to claim 1, wherein said vehicle-mounted light source is an incandescent bulb or a halogen bulb.

8. A light source lighting device comprising:

a direct current source;

an alternating current source;

current adding means for adding a selected portion of the direct current from the direct current source to the alternating current from the alternating current source, to supply the light source with a sum of direct and alternating current as a source of power for the light source;

a light source, to be mounted on a vehicle and to receive current from the current adding means; and a time delay circuit, located adjacent to the current adding means, that delays delivery of the alternating current to the current adding means by a time interval, having a selected length t0, relative to a time that the direct current is first delivered to the current adding means, whereby the light source (1) receives a reduced direct-current-only contribution during a first selected time interval and (2) receives an increased contribution of the sum of the alternating current and the direct current during a subsequent second time interval.

9. The light source lighting device according to claim 8, wherein said alternating current source includes an inverter for converting the direct current from the direct current source into alternating current.

10. The light source lighting device according to claim 8, wherein said selected portion of direct current to be added in said current adding means corresponds to a voltage range of 10 to 25 V.

11. The light source lighting device according to claim 8, wherein said selected portion of direct current to be added in said current adding means corresponds to a voltage range of 20 to 45 V.

12. The light source lighting device according to claim 8, wherein said alternating current to be added in said current adding means has a corresponding voltage range with an effective value of 1 to 15 V.

13. The light source lighting device according to claim 8, wherein said alternating current to be added in said current adding means has a corresponding frequency range of 60 to 100 KHz.

14. The light source lighting device according to claim 8, wherein said vehicle-mounted light source is an incandescent bulb or a halogen bulb.

15. The light source lighting device according to claim 8, wherein said time delay time interval length t0 lies in a range of 1 sec to 2 sec.

16. A light source lighting method for lighting a light source to be mounted on a vehicle, comprising:

converting a direct current from a vehicle-mounted battery into an alternating current;

providing a time delay, by a selected time increment t0, of the alternating current relative to the direct current;

adding the direct current and the time delayed alternating current to form a sum of the direct and alternating currents;

supplying the light source with the sum of the currents, whereby the light source (1) receives a reduced direct-current-only contribution during a first selected time interval and (2) receives an increased contribution of the sum of the alternating current and the direct current during a subsequent second time interval.

17. The light source lighting method according to claim 16, further comprising selecting said time delay t0 to lie in a range of 1 sec to 2 sec.

\* \* \* \* \*